United States Patent
Matsunaga et al.

(10) Patent No.: US 11,230,283 B2
(45) Date of Patent: Jan. 25, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Hideki Matsunaga, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 16/283,940

(22) Filed: Feb. 25, 2019

(65) Prior Publication Data

US 2019/0263397 A1 Aug. 29, 2019

(30) Foreign Application Priority Data

Feb. 27, 2018 (JP) .............................. JP2018-033687

(51) Int. Cl.
*B60W 30/095* (2012.01)
*B60W 30/09* (2012.01)
(Continued)

(52) U.S. Cl.
CPC ......... *B60W 30/0956* (2013.01); *B60Q 1/525* (2013.01); *B60W 30/09* (2013.01);
(Continued)

(58) Field of Classification Search
None
See application file for complete search history.

(56) References Cited

U.S. PATENT DOCUMENTS 9,766,626 B1* 9/2017 Zhu ........................ G01S 13/931
10,045,173 B1* 8/2018 Morimura .............. G01C 21/26
(Continued)

FOREIGN PATENT DOCUMENTS

JP 2004-203360 7/2004
JP 2005-326963 11/2005
(Continued)

OTHER PUBLICATIONS

Japanese Office Action for Japanese Patent Application No. 2018-033687 dated Sep. 7, 2021.

*Primary Examiner* — Dale W Hilgendorf
*Assistant Examiner* — Alexander C. Bost
(74) *Attorney, Agent, or Firm* — Amin, Turocy & Watson, LLP

(57) ABSTRACT

A vehicle control system including: a recognizer that is configured to recognize a surroundings status of a vehicle; and a driving controller that is configured to perform control of causing at least the vehicle to move forward or causing the vehicle to move backward on the basis of the surrounding status recognized by the recognizer; and a notification controller that is configured to notify traffic participants in the vicinity of the vehicle using an outputter in a case in which the vehicle having stopped is caused to advance in a second direction opposite to a first direction in which the vehicle has advanced before stopping by the driving controller, the driving controller is configured to cause the vehicle to advance in the second direction after the outputter is configured to perform the notification.

11 Claims, 7 Drawing Sheets

(51) Int. Cl.
  *B60Q 1/52* (2006.01)
  *B60W 40/08* (2012.01)
  *G06K 9/00* (2006.01)
  *B60W 40/04* (2006.01)
(52) U.S. Cl.
  CPC ............ *B60W 40/04* (2013.01); *B60W 40/08* (2013.01); *G06K 9/00288* (2013.01); *G06K 9/00791* (2013.01)

(56) References Cited

U.S. PATENT DOCUMENTS

| | | | | |
|---|---|---|---|---|
| 10,134,280 | B1* | 11/2018 | You | B60Q 1/34 |
| 10,392,013 | B2* | 8/2019 | Hakki | B60Q 1/50 |
| 2010/0290774 | A1* | 11/2010 | Matsuoka | B60Q 1/24 |
| | | | | 396/155 |
| 2011/0140919 | A1* | 6/2011 | Hara | G08G 1/163 |
| | | | | 340/907 |
| 2017/0217361 | A1* | 8/2017 | Miller | B60Q 1/50 |
| 2018/0072220 | A1* | 3/2018 | Yan | G08G 1/163 |
| 2018/0136654 | A1* | 5/2018 | Kentley-Klay | G05D 1/0088 |
| 2018/0174460 | A1* | 6/2018 | Jung | B60Q 1/525 |
| 2018/0190121 | A1* | 7/2018 | Kim | G08G 1/166 |
| 2018/0326982 | A1* | 11/2018 | Paris | B60W 50/0097 |
| 2018/0354489 | A1* | 12/2018 | Stayton | G05D 1/0061 |
| 2019/0100198 | A1* | 4/2019 | Hakki | B60Q 9/008 |
| 2019/0135306 | A1* | 5/2019 | Won | G06K 9/00805 |

FOREIGN PATENT DOCUMENTS

| | | |
|---|---|---|
| JP | 2009-046039 | 3/2009 |
| JP | 2009-067382 | 4/2009 |
| JP | 2016-018413 | 2/2016 |

* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2018-033687, filed Feb. 27, 2018, the content of which is incorporated herein by reference.

BACKGROUND

Field of the Invention

The present invention relates to a vehicle control system, a vehicle control method, and a storage medium.

Description of Related Art

Conventionally, a subject vehicle presence notification device that is capable of notifying a pedestrian of the presence of the subject vehicle by controlling driving of an engine sound according to an engine or the like previously incorporated into the vehicle has been disclosed (Japanese Unexamined Patent Application Publication No. 2009-67382).

Meanwhile, in recent years, automated driving for automatically controlling a vehicle has been researched. However, a relation between a behavior of a vehicle and a notification in automated driving has not been disclosed.

The present invention is realized in consideration of such situations, and one object thereof is to provide a vehicle control system, a vehicle control method, and a storage medium capable of realizing automated driving with the surroundings of a vehicle taken into account.

SUMMARY

A vehicle control system, a vehicle control method, and a storage medium according to the present invention employ the following configurations.

(1): A vehicle control system according to one aspect of the present invention is a vehicle control system including: a recognizer that is configured to recognize a surroundings status of a vehicle; a driving controller that is configured to perform control of causing at least the vehicle to move forward or causing the vehicle to move backward on the basis of the surrounding status recognized by the recognizer; and a notification controller that is configured to notify traffic participants in the vicinity of the vehicle using an outputter in a case in which the vehicle having stopped is caused to advance in a second direction opposite to a first direction in which the vehicle has advanced before stopping by the driving controller, wherein the driving controller is configured to cause the vehicle to advance in the second direction after the outputter is configured to perform the notification.

(2): In the aspect (1) described above, the recognizer is configured to recognize attributes of one or more traffic participants in the vicinity of the vehicle, and the driving controller, on the basis of the attributes of the one or more traffic participants recognized by the recognizer, is configured to determine a timing at which the vehicle is caused to advance in the second direction after the outputter is configured to perform the notification.

(3): In the aspect (1) or (2) described above, the recognizer is configured to recognize attributes of one or more traffic participants in the vicinity of the vehicle, and the driving controller, on the basis of the attributes of the one or more traffic participants recognized by the recognizer, is configured to determine an acceleration with which the vehicle advances in the second direction or a speed at which the vehicle advances in the second direction.

(4): In any one of the aspects (1) to (3) described above, the first direction is a forward movement direction, and the second direction is a backward movement direction.

(5): In the aspect (1) described above, in a case in which the vehicle is caused to move backward after the outputter is configured to perform the notification, the driving controller is configured to cause the vehicle to move backward with a first acceleration and then is configured to cause the vehicle to move backward with a second acceleration that is lower than the first acceleration.

(6): In any one of the aspects (1) to (5) described above, the traffic participants include one or more pedestrians, a vehicle in which one or more vehicle occupants are present (for example, a four-wheel vehicle or a two-wheel vehicle), or a light vehicle (for example, a bicycle) in which one or more vehicle occupants are present, the recognizer is configured to recognize directions of faces of the pedestrians or directions of faces of the vehicle occupants, and the driving controller is configured to cause the vehicle to start advancement in the second direction on the basis of the directions of the faces of the pedestrians or the directions of the faces of the vehicle occupants recognized by the recognizer after the outputter is configured to perform the notification.

(7): In the aspect (6) described above, after the outputter is configured to perform the notification, in a case in which directions of the faces of the pedestrians or the faces of the vehicle occupants recognized by the recognizer are not a direction toward the vehicle, the driving controller is configured to delays a timing at which the vehicle is caused to start to advance in the second direction more than that in a case in which the faces of the pedestrians or the faces of the vehicle occupants recognized by the recognizer are directed in a direction toward the vehicle.

(8): In the aspect (6) or (7) described above, after the outputter is configured to perform the notification, in a case in which the faces of the pedestrians or the faces of the vehicle occupants recognized by the recognizer are not directed in a direction toward the vehicle, the driving controller is configured to lowers an acceleration with which the vehicle is caused to advance in the second direction or a speed at which the vehicle is caused to advance in the second direction more than that in a case in which the faces of the pedestrians or the faces of the vehicle occupants recognized by the recognizer are directed in a direction toward the vehicle.

(9): A vehicle control method according to one aspect of the present invention is a vehicle control method using a vehicle control device including: recognizing a surroundings status of a vehicle; performing control of causing at least the vehicle to move forward or causing the vehicle to move backward on the basis of the recognized surrounding status; notifying traffic participants in the vicinity of the vehicle using an outputter in a case in which the vehicle having stopped is caused to advance in a second direction opposite to a first direction in which the vehicle has advanced before stopping; and causing the vehicle to advance in the second direction after the outputter is configured to perform the notification.

(10): A non-transitory computer-readable storage medium that stores a computer program to be executed by a computer to perform at least: recognizing a surroundings status of a vehicle; performing control of causing at least the vehicle to move forward or causing the vehicle to move backward on the basis of the recognized surrounding status; notifying traffic participants in the vicinity of the vehicle using an outputter in a case in which the vehicle having stopped is caused to advance in a second direction opposite to a first direction in which the vehicle has advanced before stopping; and causing the vehicle to advance in the second direction after the outputter is configured to perform the notification.

According to (1), (4), (5), (9), and (10) described above, automated driving with the surroundings of a vehicle taken into account can be realized.

According to (2) and (3) described above, by determining a timing at which the vehicle is caused to advance in the second direction after the outputter is configured to perform a notification on the basis of an attribute of a traffic participant, the vehicle can be controlled in accordance with the attribute of the traffic participant.

According to (6) to (8) described above, the vehicle is controlled on the basis of the direction of a face of a pedestrian or a vehicle occupant, and accordingly, automated driving with the surroundings of the vehicle taken into account can be realized.

DETAILED DESCRIPTION OF THE INVENTION

Hereinafter, a vehicle control system, a vehicle control method, and a storage medium according to embodiments of the present invention will be described with reference to the drawings.

[Entire Configuration]

Figure 1:
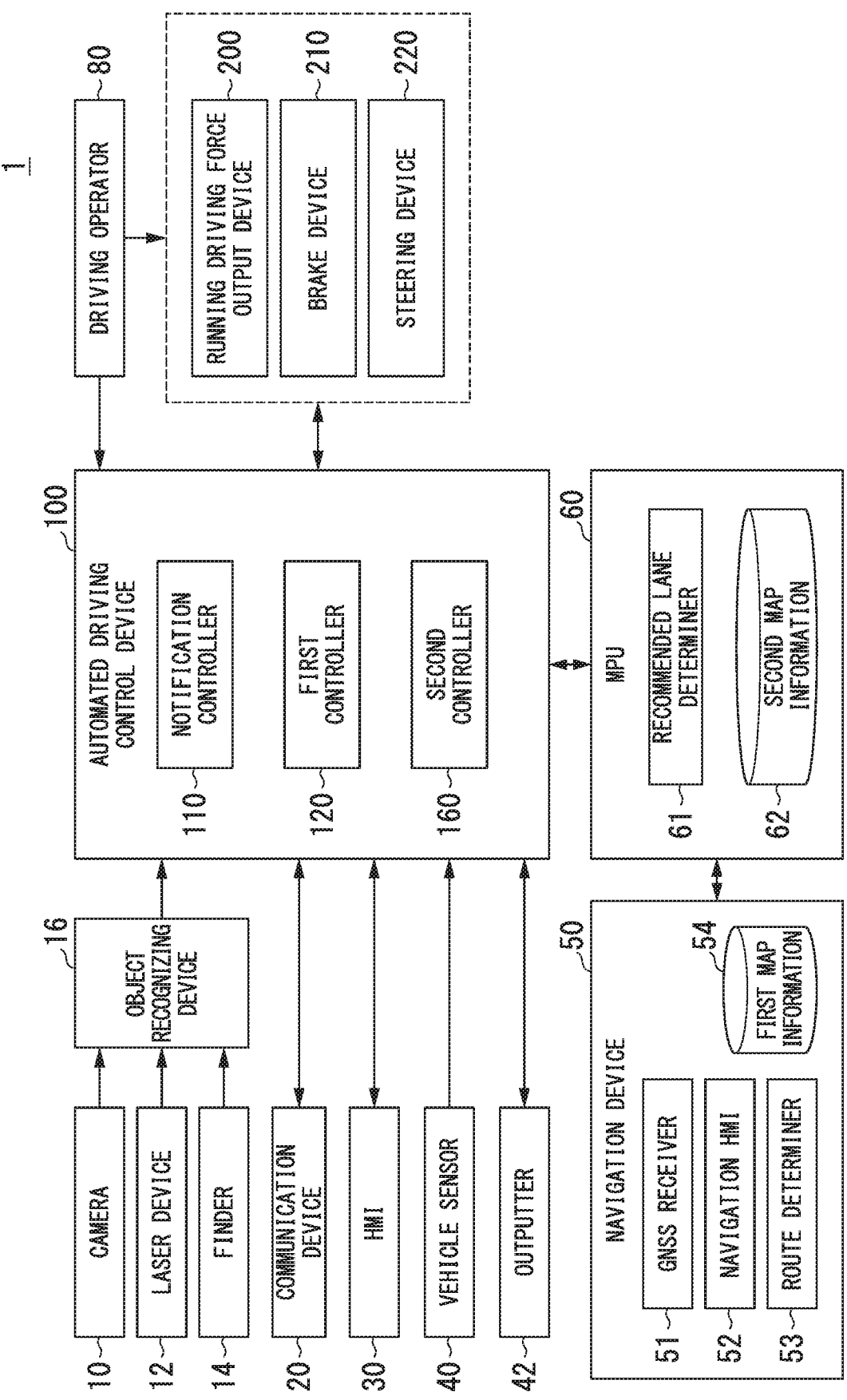
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

The vehicle system 1, for example, includes a camera 10 (10A and 10B), a radar device 12, a finder 14, an object recognizing device 16, a communication device 20, a human machine interface (HMI) 30, a vehicle sensor 40, an outputter 42, a navigation device 50, a map positioning unit (MPU) 60, a driving operator 80, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus, a part of the configuration may be omitted, and, furthermore, other components may be added thereto.

The camera 10, for example, is a digital camera using a solid-state imaging device such as a charge coupled device (CCD) or a complementary metal oxide semiconductor (CMOS). The camera 10 is installed at and arbitrary place on a vehicle (hereinafter, referred to as a subject vehicle M) in which the vehicle system 1 is mounted. The camera 10, for example, repeatedly images the vicinity of the subject vehicle M periodically. The camera 10 may be a stereo camera.

The camera 10A (not shown in the drawing) images a side in front of the subject vehicle M. The camera 10A, for example, is mounted in an upper part of a front wind shield, a rear face of a rearview mirror, or the like. The camera 10B (not shown in the drawing) images a side to the rear of the subject vehicle M. The camera 10B, for example, is mounted in a rear part of the subject vehicle M such as a vicinity of a number plate mounted in a rear part of the vehicle or a back door.

The radar device 12 emits radiowaves such as millimeter waves to the vicinity of the subject vehicle M and detects at least a position of (a distance and an azimuth to) an object by detecting radiowaves (reflected waves) reflected by the object. The radar device 12 is installed at arbitrary places on the subject vehicle M. The radar device 12 may detect a position and a speed of an object using a frequency modulated continuous wave (FM-CW) system.

The finder 14 is a light detection and ranging (LIDAR). The finder 14 emits light to the vicinity of the subject vehicle M and measures scattering light generated in accordance with the emitted light. The finder 14 detects a distance to a target on the basis of a time from light emission to light reception. The emitted light, for example, is a pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automated driving control device 100. The object recognizing device 16 may output results of detection using the camera 10, the radar device 12, and the finder 14 to the automated driving control device 100 as they are. The object recognizing device 16 may be omitted from the vehicle system 1.

The communication device 20, for example, communicates with other vehicles in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The outputter 42 outputs information representing a behavior of the subject vehicle M to traffic participants (a vehicle, a bicycle, a pedestrian, and the like) present in the vicinity of the subject vehicle M. The outputter 42, for example, is a speaker outputting speech or a display displaying an image. The outputter 42, for example, is installed on a front side and a rear side of the subject vehicle M. When the subject vehicle M starts to move from a stop state, information is output by the outputter 42 installed in a direction in which the subject vehicle starts to move. In accordance with this, a traffic participant present on the vicinity of the subject vehicle M can recognize the behavior of the subject vehicle M.

The outputter 42 may be a light, an emitter, or the like installed on the subject vehicle M. The emitter emits light indicating a locus along which the subject vehicle M plans to run, light (for example, an arrow) indicating a direction in which the subject vehicle M will advance (goes forward or backward), and the like on the road.

The navigation device 50, for example, includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or supplemented by an inertial navigation system (INS) using an output of the vehicle sensor 40. The navigation HMI 52 includes a display device, a speaker, a touch panel, a key, and the like. A part or all of the navigation HMI 52 and the HMI 30 described above may be configured to be shared. The route determiner 53, for example, determines a route from a position of the subject vehicle M identified by the GNSS receiver 51 (or an input arbitrary position) to a destination input by a vehicle occupant using the navigation HMI 52 (hereinafter referred to as a route on a map) by referring to the first map information 54. The first map information 54, for example, is information in which a road form is represented by respective links representing a road and respective nodes connected using the links. The first map information 54 may include a curvature of each road, point of interest (POI) information, and the like. The route on the map is output to the MPU 60. The navigation device 50 may perform route guidance using the navigation HMI 52 on the basis of the route on the map. Furthermore, the navigation device 50, for example, may be implemented by a function of a terminal device such as a smartphone or a tablet terminal held by a vehicle occupant. The navigation device 50 may transmit a current location and a destination to a navigation server through the communication device 20 and acquire a route that is equivalent to the route on the map from the navigation server.

The MPU 60, for example, includes a recommended lane determiner 61 and stores second map information 62 in a storage device such as an HDD or a flash memory. The recommended lane determiner 61 divides a route on the map provided from the navigation device 50 into a plurality of blocks (for example, divides the route for every 100 [m] in the advancement direction of the vehicle) and determines a recommended lane for each block by referring to the second map information 62. The recommended lane determiner 61 determines on which of lanes numbered from the left side to run. In a case in which a branching place is present in the route on the map, the recommended lane determiner 61 determines a recommended lane such that the subject vehicle M can run on a reasonable route for advancement to a branching destination.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone number information, and the like may be included. As the communication device 20 communicates with another device, the second map information 62 may be updated as needed.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or some or all of the running driving force output device 200, the brake device 210, and the steering device 220.

The automated driving control device 100, for example, includes a first controller 120, and a second controller 160. Each of the first controller 120 and second controller 160, for example, is implemented by a hardware processor such as a central processing unit (CPU) executing a program (software). In addition, some or all of such constituent elements may be implemented by hardware (a circuit; including circuitry) such as a large scale integration (LSI), an application specific integrated circuit (ASIC), a field-programmable gate array (FPGA), or a graphics processing unit (GPU) or may be implemented by cooperation between software and hardware. The program may be stored in a storage device such as an HDD or a flash memory of the automated driving control device 100 in advance or may be stored in a storage medium (non-transitory storage medium) such as a DVD or a CD-ROM that can be loaded or unloaded and installed in the HDD or the flash memory of the automated driving control device 100 by loading the storage medium into a drive device.

Figure 2:
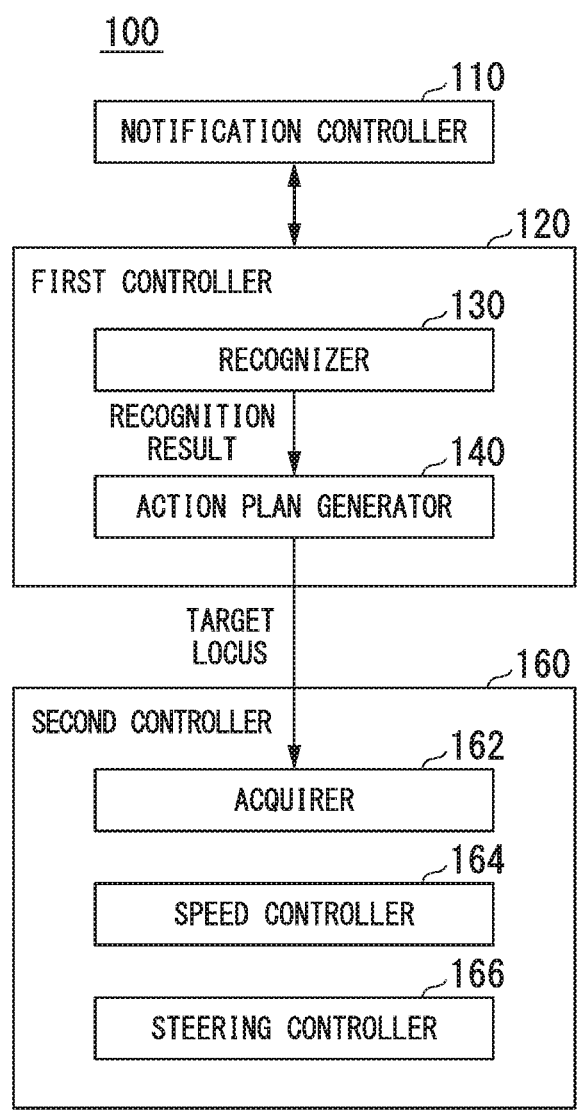
FIG. 2 is a functional configuration diagram of a notification controller, a first controller and a second controller.

FIG. 2 is a functional configuration diagram of a notification controller 110, a first controller 120, and a second controller 160. In a case in which the action plan generator 140 causes the stopped subject vehicle M to advance in a second direction opposite to a first direction in which the subject vehicle M advanced before stopping, the notification controller 110 notifies traffic participants in the vicinity of the subject vehicle M using the outputter 42.

The first controller 120, for example, includes a recognizer 130 and an action plan generator 140. A combination of the action plan generator 140 and the second controller 160 is one example of a "driving controller." The first controller 120, for example, simultaneously implements functions using artificial intelligence (AI) and functions using a model provided in advance. For example, a function of "recognizing an intersection" may be implemented by executing recognition of an intersection using deep learning or the like and recognition based on conditions given in advance (a signal, road markings, and the like that can be used for pattern matching are present) at the same time, assigning scores to processing results of both recognition processes, and comprehensively evaluating the processing results to which the scores have been assigned. Accordingly, the reliability of automated driving is secured.

The recognizer 130 recognizes states such as a position, a speed, an acceleration, and the like of each object present in the vicinity of the subject vehicle M on the basis of information input from the camera 10, the radar device 12, and the finder 14 through the object recognizing device 16. The position of an object, for example, is recognized as a position on an absolute coordinate system having a representative point (the center of gravity, the center of a driving shaft, or the like) of the subject vehicle M as its origin and is used for control. The position of an object may be represented as a representative point such as the center of gravity or a corner of an object or may be represented as a representative area. A "state" of an object may include an acceleration, a jerk, or an "action state" (for example, whether or not the object is changing lanes or will change lanes) of an object.

The recognizer 130, for example, recognizes a lane (running lane) in which the subject vehicle M is running. For example, the recognizer 130 may recognize a running lane by comparing a pattern of road partition lines acquired from the second map information 62 (for example, an array of solid lines and broken lines) with a pattern of road partition lines in the vicinity of the subject vehicle M that has been recognized from an image captured by the camera 10. The recognizer 130 is not limited to recognizing road partition lines and may recognize a running lane by recognizing running lane boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. In addition, the recognizer 130 may recognize a temporary stop line, an obstacle, a red light, a tollgate, and other road events.

When a running lane is recognized, the recognizer 130 recognizes a position and a posture of the subject vehicle M with respect to the running lane. The recognizer 130, for example, may recognize a deviation of a reference point on the subject vehicle M from the center of the lane and an angle of the advancement direction of the subject vehicle M formed with respect to a line along the center of the lane as a relative position and a posture of the subject vehicle M with respect to the running lane. Instead of this, the recognizer 130 may recognize a position of a reference point on the subject vehicle M with respect to a one side end part (a road partition line or a road boundary) of the running lane or the like as a relative position of the subject vehicle M with respect to the running lane.

The recognizer 130 recognizes an attribute of a traffic participant in the vicinity of the subject vehicle M. An attribute of a traffic participant, for example, may be a classification of a four-wheel vehicle, a two-wheel vehicle, a bicycle, and a pedestrian. For example, the recognizer 130 refers to a template that represents a feature quantity of each attribute of a traffic participant stored in a storage device of the automated driving control device 100 in advance and determines an attribute associated with a template representing a feature quantity coinciding with a feature quantity of an object recognized by the recognizer 130 as the attribute of the traffic participant. The attribute of a traffic participant may be recognized using a technique that uses machine learning such as deep learning.

The action plan generator 140 basically runs on a recommended lane determined by the recommended lane determiner 61 and generates a target locus along which the subject vehicle M will run automatically (independently of responding to a driver's operation) in the future such that a surroundings status of the subject vehicle M can be responded to. The target locus, for example, includes a speed element. For example, the target locus is represented by sequentially aligning places (locus points) at which the subject vehicle M is to arrive. A locus point is a place at which the subject vehicle M will arrive at respective predetermined running distances (for example, about every several [m]) as distances along the road, and separately, a target speed and a target acceleration for each of predetermined sampling times (for example, a fraction of a [sec]) are generated as a part of the target locus. A locus point may be a position at which the subject vehicle M will arrive at a sampling time for each of predetermined sampling times. In such a case, information of a target speed or a target acceleration is represented using intervals between the locus points.

The action plan generator 140 may set an event of automated driving when a target locus is generated. As events of automated driving, there are a constant-speed running event, a low-speed following running event, a lane change event, a branching event, a merging event, an overtaking event, and the like. The action plan generator 140 generates a target locus according to an operating event.

The second controller 160 performs control of the running driving force output device 200, the brake device 210, and the steering device 220 such that the subject vehicle M passes along a target locus generated by the action plan generator 140 at a scheduled time.

The second controller 160, for example, includes an acquirer 162, a speed controller 164, and a steering controller 166. The acquirer 162 acquires information of a target locus (a locus point) generated by the action plan generator 140 and stores the target locus information in a memory (not shown). The speed controller 164 controls the running driving force output device 200 or the brake device 210 on the basis of a speed element accompanying the target locus stored in the memory. The steering controller 166 controls the steering device 220 in accordance with a degree of curvature of the target locus stored in the memory. The processes of the speed controller 164 and the steering controller 166, for example, are implemented by a combination of feed forward control and feedback control. For example, the steering controller 166 may execute feed forward control according to the curvature of a road in front of the subject vehicle M and feedback control based on a deviation from the target locus in combination.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

[Specific Relation Between Behavior of Vehicle and Notification]

Figure 3:
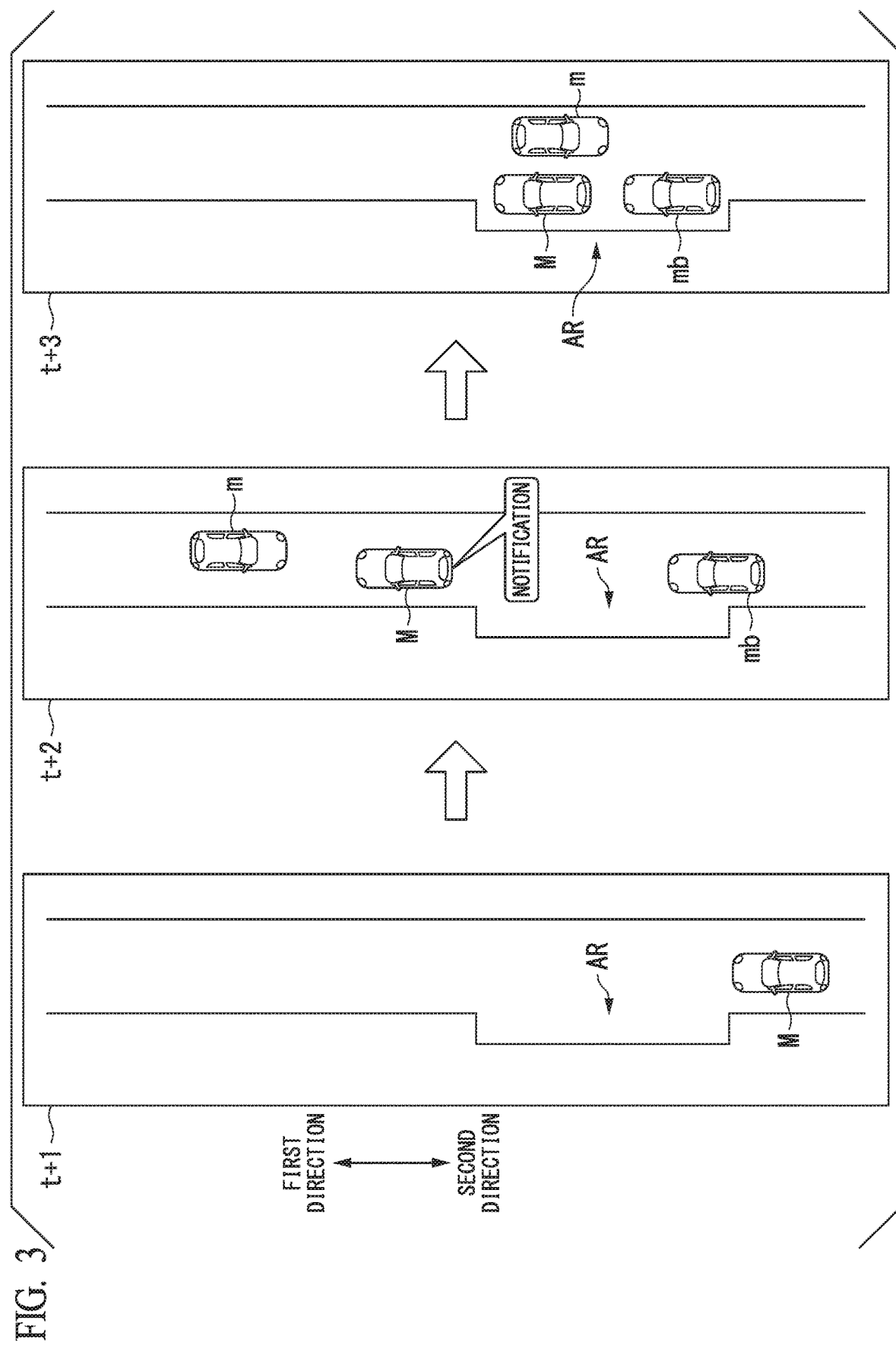
FIG. 3 is a diagram (1) showing a relation between a behavior of a vehicle and a notification.

FIG. 3 is a diagram (1) showing a relation between a behavior of a vehicle and a notification. After the outputter 42 performs a notification, the action plan generator 140 causes the subject vehicle M to advance in a second direction. In the following description, a direction from the rear side to the front side of the subject vehicle M will be described as a first direction, and a direction from the front side to the rear side of the subject vehicle M will be described as the second direction. However, a direction toward the front side may be set as the second direction, and a direction toward the rear side may be set as the first direction.

In the example shown in the drawing, it is assumed that the subject vehicle M passes along a specific road. Here, the specific road, for example, is a road having a road width for which, in a case in which a vehicle advancing in the first direction (the subject vehicle M) and a vehicle advancing in the second direction (another vehicle m) face each other, the vehicles cannot pass each other. On the specific road, a retreat area AR for a vehicle to retreat to which is disposed in the widthwise direction (for example, a left side when seen from the subject vehicle M) from the road is disposed. In a case in which the subject vehicle M and another vehicle m pass each other, the subject vehicle M or another vehicle m allows an oncoming vehicle to pass it by retreating to the retreat area AR, whereby the subject vehicle M and another vehicle m can pass each other.

At a time (t+1), the subject vehicle M is running in front of the retreat area AR. At a time (t+2), the subject vehicle M is present at a position of having passed the retreat area AR. At this time, a following vehicle mb following the subject vehicle M is present near an entrance of the retreat area (a position disposed at a predetermined distance from the subject vehicle M) to the rear of the subject vehicle M, and an oncoming vehicle m is present in front of the subject vehicle M. In the status as described above, the subject vehicle M and the oncoming vehicle m cannot pass each other. In this case, the subject vehicle M allows the oncoming vehicle m to pass it by retreating to the retreat area AR, whereby the subject vehicle M and the oncoming vehicle m may pass each other.

More specifically, in a case in which it is determined on the basis of a result of recognition acquired by the recognizer 130 that the retreat area AR is present to the rear of the subject vehicle M, and a road width of the road including the retreat area AR is larger than a width acquired by combining the width of the subject vehicle M and the width of the oncoming vehicle M, the action plan generator 140 determines that the subject vehicle M will retreat to the retreat area AR. In other words, the action plan generator 140 determines that the subject vehicle M is caused to run in the second direction. In a case in which the action plan generator 140 determines that the subject vehicle M is caused to run in the second direction, the notification controller 110 notifies traffic participants in the vicinity of the subject vehicle M thereof using the outputter 42.

At a time (t+3), the subject vehicle M proceeds to the retreat area AR. In other words, after the notification using the outputter 42, the action plan generator 140 causes the subject vehicle M to advance in the second direction. As shown in the drawing, the subject vehicle M proceeds to the retreat area AR, and accordingly, the oncoming vehicle m can pass the subject vehicle M.

In this way, by starting to advance in the second direction after the notification, the subject vehicle M can notify traffic participants present in the vicinity of the subject vehicle M of the behavior of the subject vehicle M. As a result, automated driving with the vicinity of the vehicle taken into account can be realized.

Figure 4:
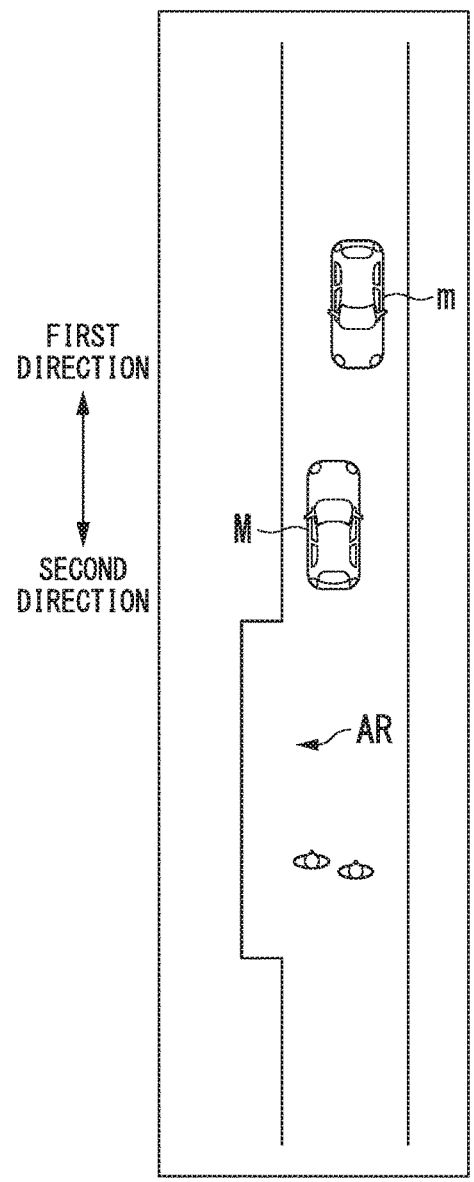
FIG. 4 is a diagram (2) showing a relation between a behavior of a vehicle and a notification.

FIG. 4 is a diagram (2) showing a relation between a behavior of a vehicle and a notification. Points different from those shown in FIG. 3 will be focused upon in the description. In the case shown in FIG. 3, although the rear vehicle mb has been described as being present to the rear of the subject vehicle M, two pedestrians are present instead of the rear vehicle mb in the case shown in FIG. 4. Also in a case in which pedestrians are present to the rear of the subject vehicle M, the subject vehicle M, after performing a notification, starts to advance in the second direction.

[Attribute of Traffic Participant and Behavior of Subject Vehicle (1)]

The action plan generator 140, on the basis of an attribute of a traffic participant recognized by the recognizer 130, after the outputter 42 performs a notification, determines a timing at which the subject vehicle M will advance in the second direction.

Figure 5:
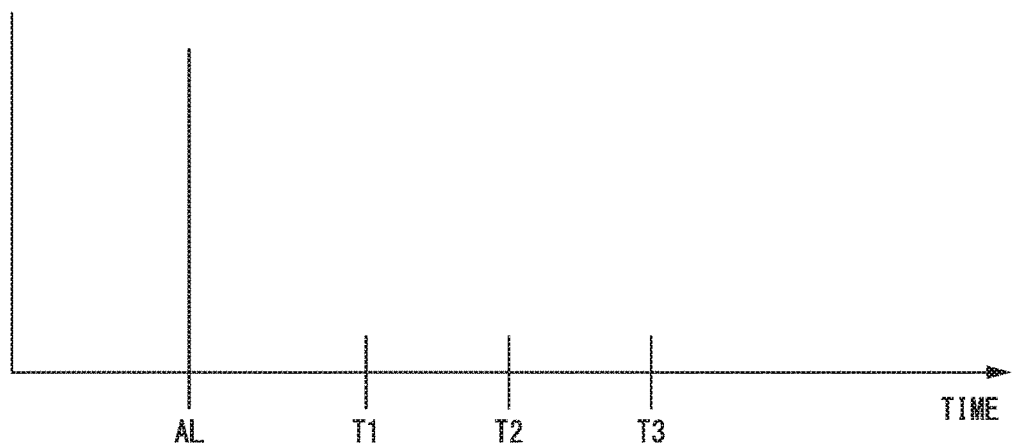
FIG. 5 is a diagram showing one example of a timing at which the subject vehicle advances in a second direction after a notification.

FIG. 5 is a diagram showing one example of a timing at which the subject vehicle M advances in the second direction after a notification. A horizontal axis of FIG. 5 shows a time. For example, it is assumed that a notification has been performed at a time AL. In a case in which the time AL is set as a start point, time elapses in order of a time T1, a time T2, and a time T3. In a case in which the attribute of a traffic participant is a vehicle, for example, the subject vehicle M starts to advance in the second direction at the time T1. On the other hand, in a case in which the attribute of a traffic participant is a pedestrian, for example, the subject vehicle M starts to advance in the second direction at the time T2. In a case in which the attribute of a traffic participant is a two-wheel vehicle, for example, the subject vehicle M starts to advance in the second direction at the time T3. In a case in which the attribute of a traffic participant is a pedestrian, the subject vehicle M advances in the second direction at the time T1, and, in a case in which the attribute of a traffic participant is a vehicle, the subject vehicle M may advance in the second direction at the time T2 or the time T3. For example, a traffic participant of which the attribute described above is determined is a traffic participant that is the closest from the subject vehicle M. In addition, a traffic participant of which the attribute described above is determined may be a plurality of traffic participants present within a predetermined distance from the subject vehicle M. In such a case, for example, a time at which the subject vehicle M starts to advance is a time at which the attribute of a traffic participant starts to advance toward the advance direction the subject vehicle M advance. The traffic participant is a traffic participant who starts to advance last.

In this way, by changing a timing at which advancement starts in accordance with the attribute of a traffic participant, automated driving with the vicinity of the vehicle taken into account can be realized. For example, it is relatively difficult for a traffic participant such as a two-wheel vehicle to move than a traffic participant such as a pedestrian. By setting a time interval from a notification to a traffic participant such as a two-wheel vehicle to a time when the subject vehicle M starts to move as being longer than a time interval from a notification to a traffic participant such as a pedestrian to a time when the subject vehicle M starts to move, automated driving with the vicinity of the vehicle taken into account can be realized.

[Attribute of Traffic Participant and Behavior of Subject Vehicle (2)]

The action plan generator 140 determines an acceleration or a speed with which the subject vehicle M advances in the second direction on the basis of an attribute of a traffic participant recognized by the recognizer 130.

Figure 6:
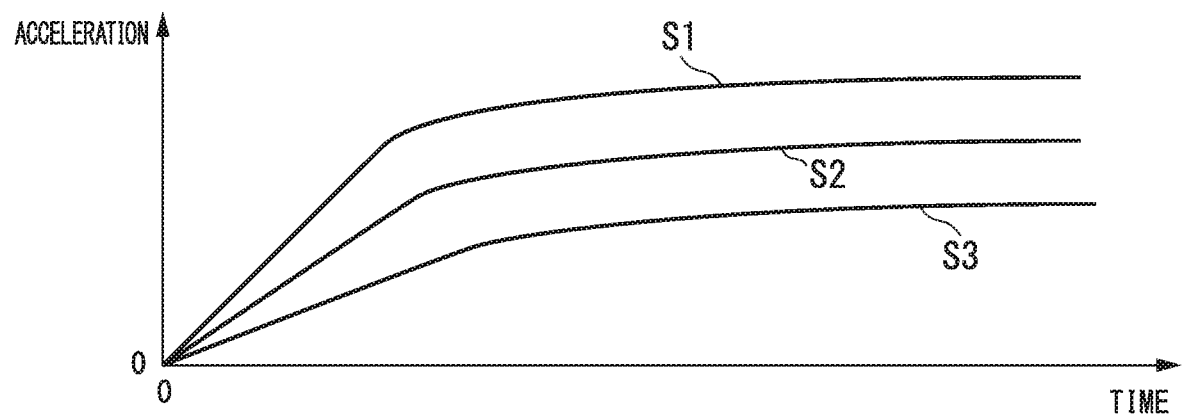
FIG. 6 is a diagram showing one example of changes in acceleration with which the subject vehicle advances in the second direction after a notification.

FIG. 6 is a diagram showing one example of changes in acceleration with which the subject vehicle M advances in the second direction after a notification. In FIG. 6, a vertical axis represents the acceleration, and a horizontal axis represents the time. For example, the subject vehicle M will be described to start advancement at a time zero. The degree of acceleration is high in order of a first degree, a second degree, and a third degree. The maximum speed is high in order of a maximum speed at the first degree, the maximum speed at the second degree, and the maximum speed at the third degree. In a case in which the attribute of a traffic participant is the vehicle, for example, the vehicle is caused to advance by performing acceleration with the first degree represented as a transition line S1. On the other hand, in a case in which the attribute of a traffic participant is the two-wheel vehicle, for example, the vehicle is caused to advance by performing acceleration with the second degree represented as a transition line S2. In a case in which the attribute of a traffic participant is the pedestrian, for example, the vehicle is caused to advance by performing acceleration with the third degree represented as a transition line S3.

In this way, by changing the advancement speed in accordance with the attribute of a traffic participant, automated driving with the vicinity of the vehicle taken into account can be realized. For example, while there are a traffic participant such as a pedestrian that can relatively easily move and a traffic participant such as a two-wheel vehicle that is difficult to move, the process is executed as described above on the basis of the attribute of a traffic participant, and accordingly, automated driving with the vicinity of the vehicle taken into account can be realized.

In a case in which a traffic participant is a pedestrian, a timing at which the subject vehicle M advances in the second direction, an acceleration, a speed, or the like of the advancement may be changed on the basis of an attribute of the pedestrian. The attributes of the pedestrian, for example are classified into an old person, an adult, a child, a pregnant woman, and the like. For example, in a case in which the attribute of the pedestrian is an old person, a child, a pregnant woman, or the like, a timing at which the subject vehicle M advances in the second direction is delayed more than in a case in which the attribute of the pedestrian is the adult, or an acceleration or a speed with which the subject vehicle M advances in the second direction is set to be lower than that in the case in which the attribute of the pedestrian is the adult.

[Direction of Face of Traffic Participant and Behavior of Subject Vehicle]

A traffic participant includes one or more objects among a pedestrian, a vehicle in which a vehicle occupant is present, and a two-wheel vehicle in which a vehicle occupant is present. After the outputter 42 is configured to perform a notification, the action plan generator 140 is configured to cause the subject vehicle M to start advancement in the second direction on the basis of the direction of a face of a pedestrian or a vehicle occupant recognized by the recognizer 130.

The recognizer 130 analyzes an image captured by the camera 10B and recognizes the direction of a face of a pedestrian or the direction of a face of a vehicle occupant. The recognizer 130 extracts a template matching a feature quantity of an object recognized by the recognizer 130 by referring to templates of head parts (faces) of pedestrians. For example, the templates of head parts are prepared in the directions of the head parts and are stored in a storage device of the automated driving control device 100. The recognizer 130 recognizes the direction of a head part associated with an extracted template as the direction of a face of a pedestrian or the direction of a face of a vehicle occupant.

Figure 7:
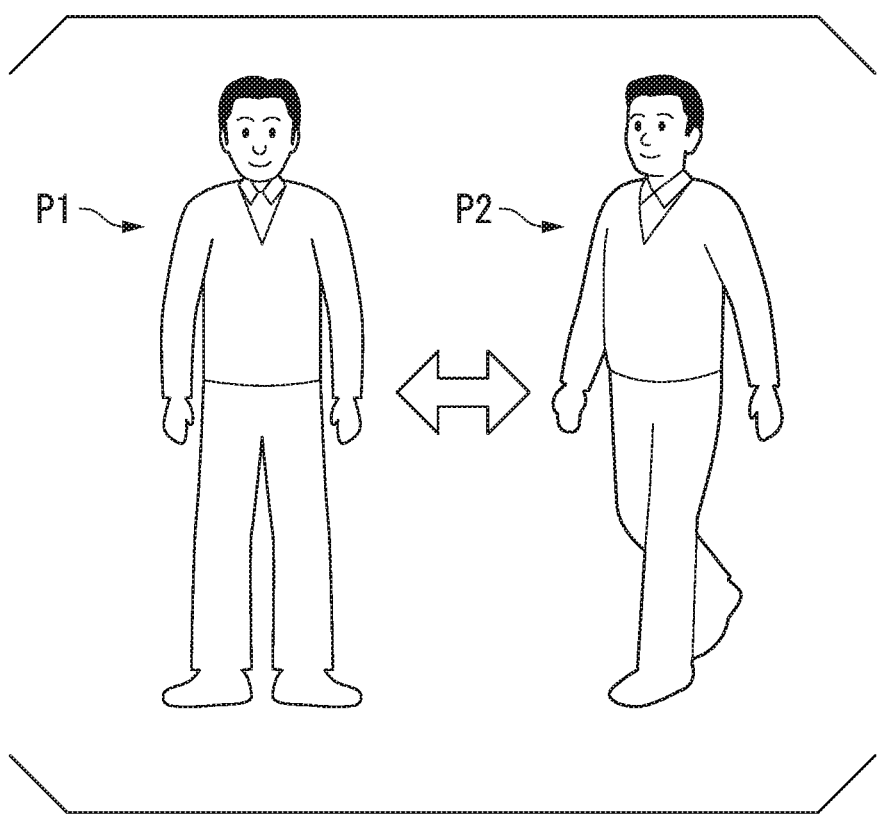
FIG. 7 is a diagram showing one example of an image in which pedestrians are imaged by a camera.

FIG. 7 is a diagram showing one example of an image in which pedestrians are imaged by the camera 10B. In the example shown in FIG. 7, the pedestrians are positioned in rear of the subject vehicle M and near the center of the subject vehicle M in the width direction. A face of the pedestrian P1 shown in FIG. 7 is directed in a direction toward the subject vehicle M. A face of the pedestrian P2 shown in FIG. 7 is directed in a direction (horizontal direction) different from that of the subject vehicle M. In a case in which the face of the pedestrian is directed toward the subject vehicle M after the outputter 42 performs a notification, the action plan generator 140 causes the subject vehicle M to start advancement. On the other hand, in a case in which the face of the pedestrian is not directed toward the subject vehicle M after the outputter 42 performs a notification, the action plan generator 140 does not cause the subject vehicle M to start advancement. In this case, the notification controller 110 may perform a notification again and, in a case in which the face of the pedestrian is directed in a direction toward the subject vehicle M, cause the subject vehicle M to start advancement. In a case in which the face of the pedestrian is not directed in a direction toward the subject vehicle M, the subject vehicle M may advance more slowly than in a case in which the face of the pedestrian is directed in a direction toward the subject vehicle M.

In this way, by controlling the subject vehicle M on the basis of the direction of the face of the pedestrian or the direction of the face of the vehicle occupant, automated driving with the vicinity of the vehicle taken into account can be realized. For example, in a case in which the direction of the face of the pedestrian or the face of the vehicle occupant is not a direction toward the subject vehicle M, the subject vehicle M performs a behavior from which the direction of the face of the pedestrian or the presence of the subject vehicle M may be easily recognized by a vehicle occupant, and accordingly, the safety of the subject vehicle M and traffic participants disposed in the vicinity thereof is improved, and automated driving with the vicinity of the vehicle taken into account can be realized.

[Flowchart]

Figure 9:
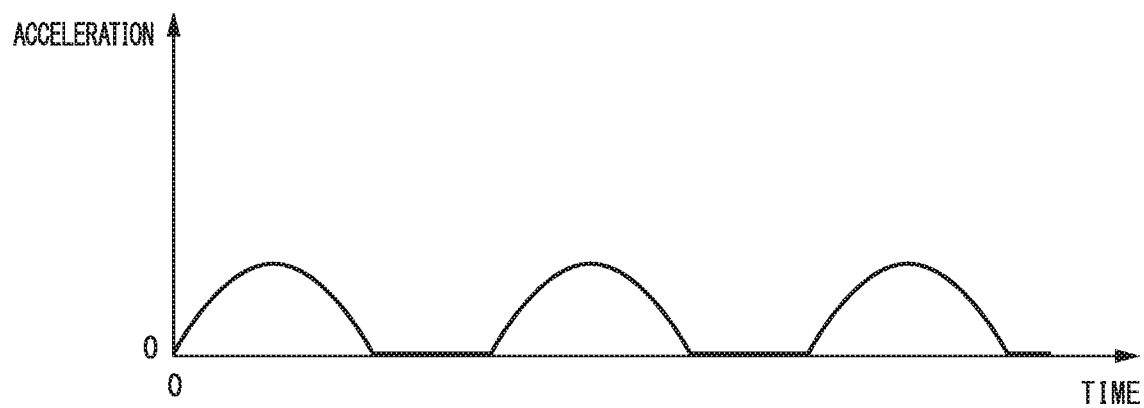
FIG. 9 is a diagram showing one example of changes in acceleration in a case in which acceleration and deceleration are performed.

FIG. 9 is a flowchart showing one example of a flow of a process executed by the automated driving control device 100. In this process, in a case in which the subject vehicle M and an oncoming vehicle run on a specific road, a status in which the vehicles cannot pass each other unless the subject vehicle M moves backward and retreats to the retreat area AR (a status at the time t+2 shown in FIG. 3) will be assumed in description.

An 11-th timing to a 13-th timing to be described below are timings at which the subject vehicle M starts to move backward after the outputter 42 performs a notification. The time elapses from a notification timing in order of the 11-th timing, the 12-th timing, and the 13-th timing.

The 11-th timing, for example, is a timing set in advance and is a timing closer to the notification time than the 12-th timing. The 12-th timing, for example, is a time (a minimum setting value X [msec]) that is inversely proportional to a distance between the subject vehicle M and a traffic participant present in rear of the subject vehicle M. The 13-th timing, for example, is a time acquired by multiplying a time that is inversely proportional to the distance between the subject vehicle M and a traffic participant present in rear of the subject vehicle M by a coefficient (for example, 1.5) exceeding "1".

A first behavior to a third behavior to be described below are accelerations at the time of backward movement of the subject vehicle M or speeds at the time of backward movement of the subject vehicle M. The first behavior, for example, is a behavior of the subject vehicle M moving backward with a degree of a predetermined acceleration and moving backward at a first setting speed in a case in which the speed reaches the first setting speed. The second behavior, for example, is a behavior of the subject vehicle M moving backward with a degree of a predetermined acceleration and moving backward at a second setting speed in a case in which the speed reaches the second setting speed. The second setting speed is a speed (for example, a speed that is about 70% of the first setting speed) lower than the first setting speed. The third behavior, for example, is a behavior of the subject vehicle M moving backward with a degree of a predetermined acceleration and moving backward at a second setting speed in a case in which the speed reaches the second setting speed and is, for example, a behavior of further moving backward by a distance that is about ⅓ of an inter-vehicle distance between the subject vehicle M and a traffic participant. In a case in which ⅓ of the inter-vehicle distance exceeds an upper limit value [cm], the behavior of movement corresponding to the upper limit value is performed.

Figure 8:
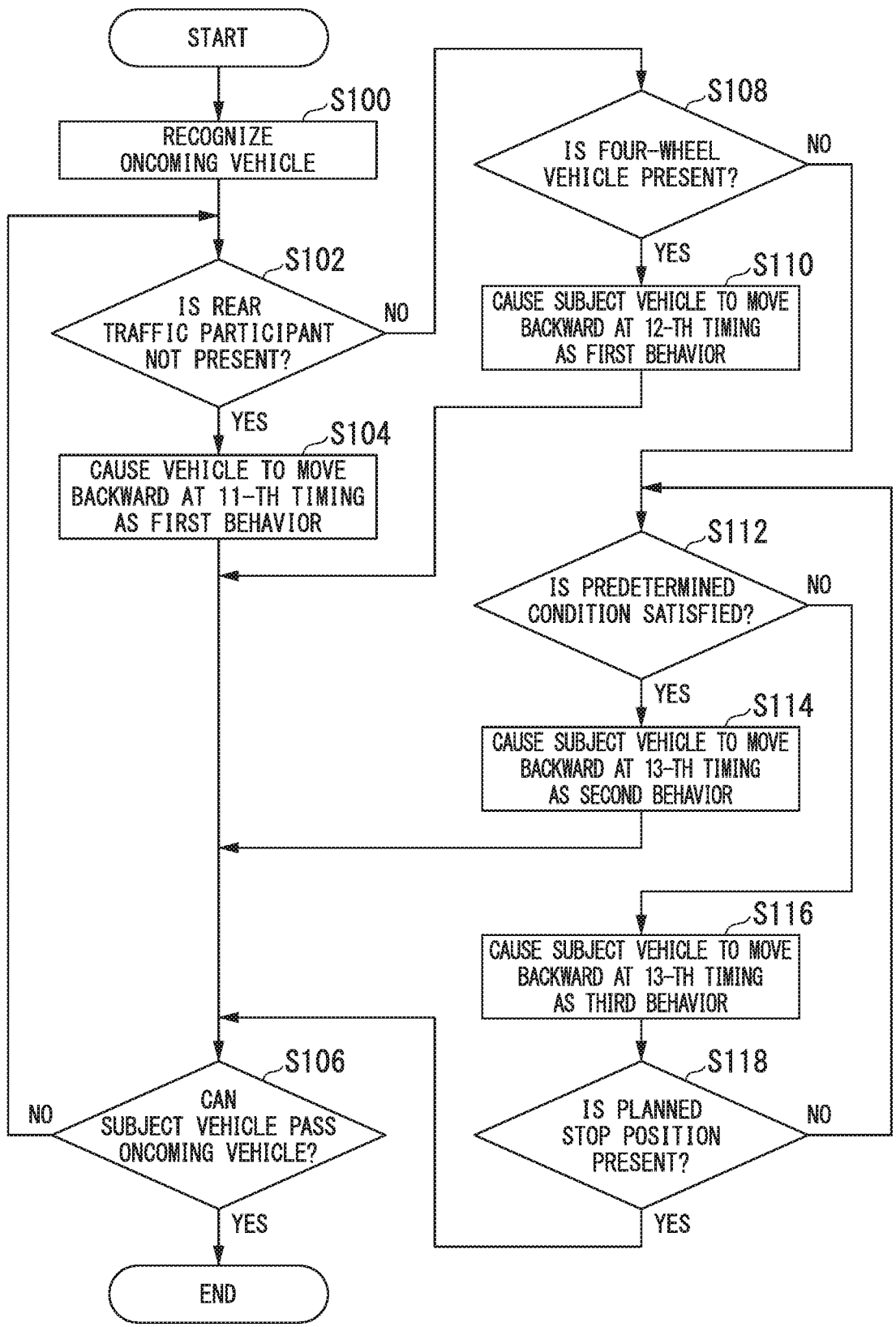
FIG. 8 is a flowchart showing one example of a flow of a process executed by an automated driving control device.

The description will be continued with reference to FIG. 8. First, the recognizer 130 recognizes an oncoming vehicle (Step S100). Next, the recognizer 130 determines whether or not a traffic participant is present within a predetermined distance in rear of the subject vehicle M (Step S102).

In a case in which a traffic participant is not present within the predetermined distance in rear of the subject vehicle M, the action plan generator 140 causes the subject vehicle M to start backward movement at the 11-th timing and causes the subject vehicle M move backward in accordance with the first behavior (Step S104). Next, the recognizer 130 determines whether or not the subject vehicle M can pass the oncoming vehicle (Step S106). In a case in which the subject vehicle can pass the oncoming vehicle (for example, in a case in which the subject vehicle M retreats to the retreat area), the process of this flowchart ends. On the other hand, in a case in which the subject vehicle cannot pass the oncoming vehicle, the process is returned to the process of Step S102. The subject vehicle being able to pass the oncoming vehicle includes a case in which, in an environment in which an intersection such as a three-forked road or a crossroad is present within a predetermined distance from the subject vehicle M, the subject vehicle M passes the intersection from a narrow road by moving backward and passes the oncoming vehicle using the intersection.

In a case in which a traffic participant is present within a predetermined distance in rear of the subject vehicle M, the recognizer 130 determines whether or not the traffic participant in rear of the subject vehicle is a four-wheel vehicle (Step S108). In a case in which the rear traffic participant is a four-wheel vehicle, the action plan generator 140 causes the subject vehicle M to start backward movement at a 12-th timing and causes the subject vehicle M to move backward as a first behavior (Step S110).

On the other hand, in a case in which the rear traffic participant is not a four-wheel vehicle (for example, in the case of a two-wheel vehicle or a pedestrian), the recognizer 130 determines whether or not a predetermined condition is satisfied (Step S112). Here, the "predetermined condition", for example, the face of the pedestrian or the face of the vehicle occupant being directed in a direction toward the subject vehicle M. The "predetermined condition", for example, may be a condition that the face of the pedestrian or the face of the vehicle occupant is directed in a direction toward the subject vehicle M, and the traffic participant is not approaching the subject vehicle M.

In a case in which the predetermined condition is satisfied, the action plan generator 140 causes the subject vehicle M to start backward movement at a 13-th timing and causes the subject vehicle M to move backward as a second behavior (Step S114). On the other hand, in a case in which the predetermined condition is not satisfied, the action plan generator 140 causes the subject vehicle M to start backward movement at the 13-th timing and causes the subject vehicle M to move backward as a third behavior (Step S116).

Next, the action plan generator 140 determines whether or not the subject vehicle M has arrived at a planned stop position set in advance (Step S118). Here, the planned stop position, for example, is a position at a predetermined distance from the rear traffic participant.

In a case in which the subject vehicle M has not arrived at the planned stop position set in advance, the process is returned to the process of Step S112. On the other hand, in a case in which the subject vehicle M has arrived at the planned stop position set in advance, the process proceeds to the process of Step S106. In this way, the process of this flowchart ends. In a case in which a distance from the rear traffic participant becomes a predetermined distance during the backward movement of the subject vehicle M, the subject vehicle M stops.

As described above, since the subject vehicle M is controlled in accordance with the status of the vicinity of the subject vehicle M, the safety of the subject vehicle M and traffic participants in the vicinity thereof is improved, and automated driving with the vicinity of the vehicle taken into account can be realized.

[Other Example]

In the example described above, although the subject vehicle has been described to advance without deceleration in a case in which the subject vehicle advances in the second direction after stop, acceleration and deceleration may be repeated in a case in which the subject vehicle advances in the second direction. In a case in which the subject vehicle M is caused to move backward after the outputter 42 performs a notification, the action plan generator 140 causes the subject vehicle M to move backward with a first acceleration and then causes the subject vehicle M to move backward with a second acceleration that is lower than the first acceleration.

FIG. 9 is a diagram showing one example of changes in acceleration in a case in which acceleration and deceleration are performed. In FIG. 9, the vertical axis represents the acceleration, and the horizontal axis represents the time. For example, after accelerating with a predetermined degree, the subject vehicle M decelerates with a predetermined degree and temporarily stops. The subject vehicle M repeats this process. The process of stopping may be omitted. For example, the process of repeating acceleration, deceleration, and stopping as shown in FIG. 9, for example, is performed in Step S116 of the flowchart shown in FIG. 8.

In this way, the subject vehicle M advances through repetition of acceleration and deceleration, whereby traffic participants can recognize the presence or the behavior of the subject vehicle M.

According to the embodiment described above, the automated driving control device 100 includes the recognizer 130 that recognizes a surroundings status of the subject vehicle M, the action plan generator 140 that performs control of causing at least the subject vehicle M to advance or causing the subject vehicle M to move backward on the basis of the surroundings status recognized by the recognizer 130, and the notification controller 110 that notifies traffic participant in the vicinity of the subject vehicle M using the outputter 42 in a case in which the subject vehicle M having stopped is caused to advance in a second direction that is opposite to a first direction in which the subject vehicle has advanced before stop by the action plan generator 140, and the action plan generator 140 causes the subject vehicle M to advance in the second direction after the outputter 42 performs a notification, whereby automated driving with the vicinity of the vehicle taken into account can be realized.

[Hardware Configuration]

Figure 10:
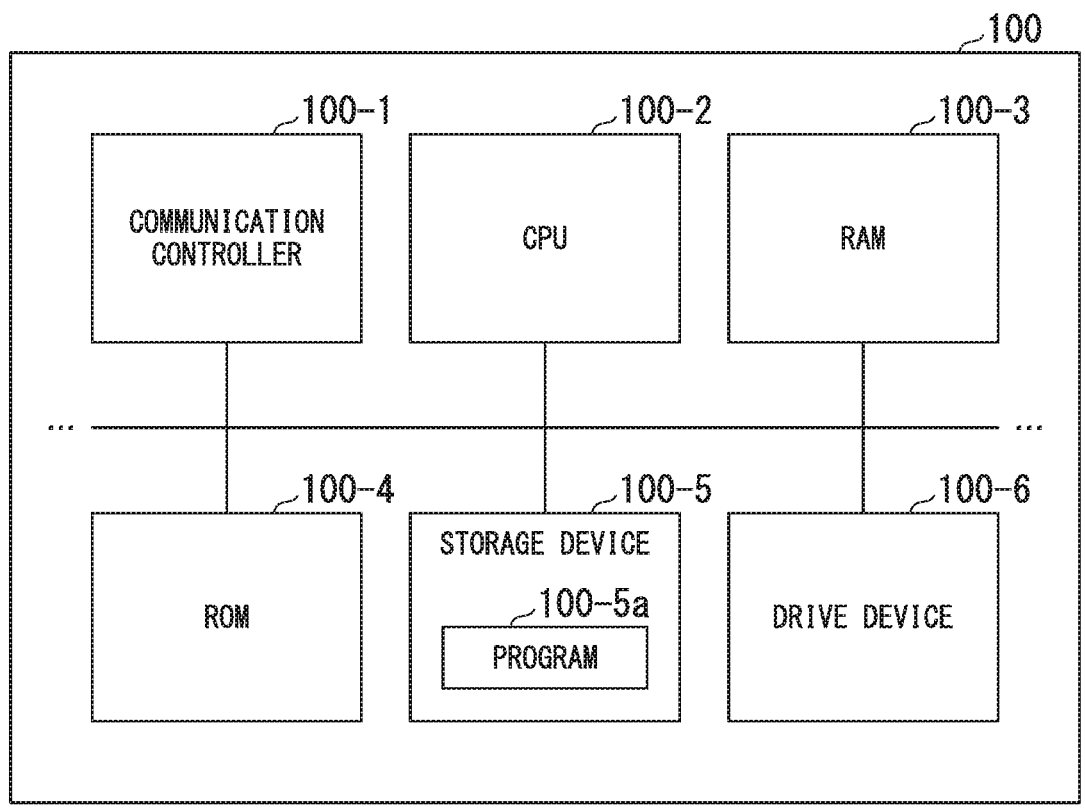
FIG. 10 is a diagram showing one example of the hardware configuration of an automated driving control device according to an embodiment.

FIG. 10 is a diagram showing one example of the hardware configuration of an automated driving control device 100 according to an embodiment. As shown in the drawing, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an hard disk drive (HDD), a drive device 100-6, and the like are interconnected through an internal bus or a dedicated communication line. The communication controller 100-1 communicates with constituent elements other than the automated driving control device 100. A program 100-5a executed by the CPU 100-2 is stored in the storage device 100-5. This program is expanded into the RAM 100-3 by a direct memory access (DMA) controller (not shown in the drawing) or the like and is executed by the CPU 100-2. In this way, some or all of the notification controller 110, the recognizer 130, the action plan generator 140, and the second controller 160 are realized.

The embodiment described above can be represented as below.

A vehicle control device including a storage device storing a program and a hardware processor and configured such that the hardware processor, by executing the program stored in the storage device, recognizes a surroundings status of a vehicle, performs control of causing at least the vehicle to move forward or causing the vehicle to move backward on the basis of the recognized surrounding status, and, in a case in which the vehicle having stopped is caused to advance in a second direction that is opposite to a first direction in which the vehicle has advanced before stopping, notifies traffic participants in the vicinity of the vehicle using an outputter and causes the vehicle to advance in the second direction after the outputter performs the notification.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
a memory that stores instructions; and
one or more processors that execute the instructions to:
recognize an area surrounding a vehicle;
perform control of causing at least the vehicle to move forward or causing the vehicle to move backward based on the area surrounding the vehicle; and
notify traffic participants in a vicinity of the vehicle in response to determining that the vehicle having stopped is caused to advance in a second direction opposite to a first direction in which the vehicle has advanced before being stopped,
wherein, in response to determining that a traffic participant is a four-wheel vehicle, the one or more processors execute instructions to: cause the vehicle to advance in the second direction at a first time after notifying the traffic participants in the vicinity of the vehicle, and
in response to determining that the traffic participant is a two-wheel vehicle or a pedestrian, the one or more processors execute instructions to: cause the vehicle to advance in the second direction at a second time or a third time that is later than the first time after notifying the traffic participants in the vicinity of the vehicle,
wherein, in response to determining that the traffic participant is a four-wheel vehicle, the one or more processors execute instructions to: cause the vehicle to advance in the second direction at a first acceleration degree after notifying the traffic participants in the vicinity of the vehicle, and
in response to determining that the traffic participant is a two-wheel vehicle or a pedestrian, the one or more processors execute instructions to: cause the vehicle to advance in the second direction at a second acceleration degree or a third acceleration degree that is lower than the first acceleration degree after notifying the traffic participants in the vicinity of the vehicle.

2. The vehicle control system according to claim 1,
wherein the first direction is a forward movement direction, and
wherein the second direction is a backward movement direction.

3. The vehicle control system according to claim 2, wherein, in response to determining that the vehicle is caused to move backward after notifying the traffic participants in the vicinity of the vehicle, the one or more processors execute instructions to: cause the vehicle to move backward with the first acceleration degree and then cause the vehicle to move backward with the second acceleration degree that is lower than the first acceleration degree.

4. The vehicle control system according to claim 1,
wherein the traffic participants include one or more pedestrians, a vehicle in which one or more vehicle occupants are present, or a light vehicle in which one or more vehicle occupants are present,
wherein the one or more processors execute instructions to: recognize directions of faces of the pedestrians or directions of faces of the vehicle occupants, and
wherein the one or more processors execute instructions to: cause the vehicle to start advancement in the second direction based on the directions of the faces of the pedestrians or the directions of the faces of the vehicle occupants after notifying the traffic participants in the vicinity of the vehicle.

5. The vehicle control system according to claim 4, wherein, after notifying the traffic participants in the vicinity of the vehicle, in response to determining that directions of the faces of the pedestrians or the faces of the vehicle occupants are not a direction toward the vehicle, the one or more processors execute instructions to: delay a timing at which the vehicle is caused to start to advance in the second direction more than that in response to determining that the faces of the pedestrians or the faces of the vehicle occupants are directed in a direction toward the vehicle.

6. The vehicle control system according to claim 4, wherein, after notifying the traffic participants in the vicinity of the vehicle, in response to determining that the faces of the pedestrians or the faces of the vehicle occupants are not directed in a direction toward the vehicle, the one or more processors execute instructions to: lower an acceleration with which the vehicle is caused to advance in the second direction or a speed at which the vehicle is caused to advance in the second direction more than that in response to determining that the faces of the pedestrians or the faces of the vehicle occupants are directed in a direction toward the vehicle.

7. A vehicle control method using a vehicle control device, the vehicle control method comprising:
recognizing an area surrounding a vehicle;
performing control of causing at least the vehicle to move forward or causing the vehicle to move backward based on the area surrounding the vehicle;
notifying traffic participants in a vicinity of the vehicle in response to determining that the vehicle having stopped is caused to advance in a second direction opposite to a first direction in which the vehicle has advanced before being stopped,
wherein, in response to determining that a traffic participant is a four-wheel vehicle, causing the vehicle to advance in the second direction at a first time after notifying the traffic participants in the vicinity of the vehicle, and
in response to determining that the traffic participant is a two-wheel vehicle or a pedestrian, causing the vehicle to advance in the second direction at a second time or a third time that is later than the first time after notifying the traffic participants in the vicinity of the vehicle, or wherein, in response to determining that the traffic participant is a four-wheel vehicle, causing the vehicle to advance in the second direction at a first acceleration degree after notifying the traffic participants in the vicinity of the vehicle, and
in response to determining that the traffic participant is a two-wheel vehicle or a pedestrian, causing the vehicle to advance in the second direction at a second acceleration degree or a third acceleration degree that is lower than the first acceleration degree after notifying the traffic participants in the vicinity of the vehicle.

8. A non-transitory computer-readable storage medium that stores a computer program to be executed by a computer to perform at least:
recognize an area surrounding a vehicle;
perform control of causing at least the vehicle to move forward or causing the vehicle to move backward based on the area surrounding the vehicle;
notify traffic participants in a vicinity of the vehicle in response to determining that the vehicle having stopped is caused to advance in a second direction opposite to a first direction in which the vehicle has advanced before being stopped,
wherein, in response to determining that a traffic participant is a four-wheel vehicle, cause the vehicle to advance in the second direction at a first time after notifying the traffic participants in the vicinity of the vehicle, and
in response to determining that the traffic participant is a two-wheel vehicle or a pedestrian, cause the vehicle to advance in the second direction at a second time or a third time that is later than the first time after notifying the traffic participants in the vicinity of the vehicle, or
wherein, in response to determining that the traffic participant is a four-wheel vehicle, cause the vehicle to advance in the second direction at a first acceleration degree after notifying the traffic participants in the vicinity of the vehicle, and
in response to determining that the traffic participant is a two-wheel vehicle or a pedestrian, cause the vehicle to advance in the second direction at a second acceleration degree or a third acceleration degree that is lower than the first acceleration degree after notifying the traffic participants in the vicinity of the vehicle.

9. The vehicle control system according to claim 1,
wherein, in response to determining that the traffic participant is the four-wheel vehicle and the one or more processors execute instructions to: cause the vehicle to advance in the second direction at the first time after notifying the traffic participants in the vicinity of the vehicle, and
in response to determining that the traffic participant is a two-wheel vehicle or the pedestrian and the one or more processors execute instructions to: cause the vehicle to advance in the second direction at the second time or the third time that is later than the first time after notifying the traffic participants in the vicinity of the vehicle,
the one or more processors cause the vehicle to advance in the second direction at the first time after notifying the traffic participants in the vicinity of the vehicle and cause the vehicle to advance in the second direction at the second time or the third time that is later than the first time after notifying the traffic participants in the vicinity of the vehicle based on the vehicle being present on a road that has a first width in which vehicles cannot pass each other, in response to determining that the vehicle advancing in the first direction and another vehicle advancing in the second direction face each other, the road has a retreat area for the vehicle or the another vehicle to retreat, and the retreat area being disposed in a widthwise direction from the road, and a second width including the first width and a width of the retreat area is greater than a third width of a width of the vehicle and the another vehicle, or in response to determining that the traffic participant is the four-wheel vehicle, the one or more processors execute instructions to: cause the vehicle to advance in the second direction at the first acceleration degree after notifying the traffic participants in the vicinity of the vehicle, and in response to determining that the traffic participant is the two-wheel vehicle or the pedestrian and the one or more processors execute instructions to: cause the vehicle to advance in the second direction at the second acceleration degree or the third acceleration degree that is lower than the first acceleration degree after notifying the traffic participants in the vicinity of the vehicle, the one or more processors cause the vehicle to advance in the second direction at the first acceleration degree after notifying the traffic participants in the vicinity of the vehicle and cause the vehicle to advance in the second direction at the second acceleration degree or the third acceleration degree that is lower than the first acceleration degree after notifying the traffic participants in the vicinity of the vehicle based on the vehicle being present on the road that has the first width in which vehicles cannot pass each other, in response to determining that the vehicle advancing in the first direction and the another vehicle advancing in the second direction face each other, the road has the retreat area for the vehicle or the another vehicle to retreat, the retreat area being disposed in the widthwise direction from the road, and the second width including the first width and the width of the retreat area being greater than the third width of the width of the vehicle and the another vehicle.

10. The vehicle control system according to claim 1, wherein, in response to determining that the traffic participant is the pedestrian, the one or more processors execute instructions to: cause the vehicle to advance in the second direction at the second time after notifying the traffic participants, and in response to determining that the traffic participant is the two-wheeled vehicle, the one or more processors execute instructions to: cause the vehicle to advance in the second direction at the third time that is later than the second time after notifying the traffic participants, or wherein, in response to determining that the traffic participant is the pedestrian, the one or more processors execute instructions to: cause the vehicle to advance in the second direction at the second acceleration degree after notifying the traffic participants, and in response to determining that the traffic participant is the two-wheel vehicle, the one or more processors execute instructions to: cause the vehicle to advance in the second direction at the third acceleration degree that is lower than the second acceleration degree after notifying the traffic participants.

11. The vehicle control system according to claim 10, wherein, in response to determining that the traffic participant is the four-wheel vehicle and the one or more processors execute instructions to: cause the vehicle to advance in the second direction at the first time after notifying the traffic participants in the vicinity of the vehicle, and in response to determining that the traffic participant is a two-wheel vehicle or the pedestrian and the one or more processors execute instructions to: cause the vehicle to advance in the second direction at the second time or the third time that is later than the first time after notifying the traffic participants in the vicinity of the vehicle, the one or more processors cause the vehicle to advance in the second direction at the first time after notifying the traffic participants in the vicinity of the vehicle and cause the vehicle to advance in the second direction at the second time or the third time that is later than the first time after notifying the traffic participants in the vicinity of the vehicle based on the vehicle being present on a road that has a first width in which vehicles cannot pass each other, in response to determining that the vehicle advancing in the first direction and another vehicle advancing in the second direction face each other, the road has a retreat area for the vehicle or the another vehicle to retreat, and the retreat area being disposed in a widthwise direction from the road, and a second width including the first width and a width of the retreat area is greater than a third width of a width of the vehicle and the another vehicle, or in response to determining that the traffic participant is the four-wheel vehicle, the one or more processors execute instructions to: cause the vehicle to advance in the second direction at the first acceleration degree after notifying the traffic participants in the vicinity of the vehicle, and in response to determining that the traffic participant is the two-wheel vehicle or the pedestrian and the one or more processors execute instructions to: cause the vehicle to advance in the second direction at the second acceleration degree or the third acceleration degree that is lower than the first acceleration degree after notifying the traffic participants in the vicinity of the vehicle, the one or more processors cause the vehicle to advance in the second direction at the first acceleration degree after notifying the traffic participants in the vicinity of the vehicle and cause the vehicle to advance in the second direction at the second acceleration degree or the third acceleration degree that is lower than the first acceleration degree after notifying the traffic participants in the vicinity of the vehicle based on the vehicle being present on the road that has the first width in which vehicles cannot pass each other, in response to determining that the vehicle advancing in the first direction and the another vehicle advancing in the second direction face each other, the road has the retreat area for the vehicle or the another vehicle to retreat, the retreat area being disposed in the widthwise direction from the road, and the second width including the first width and the width of the retreat area being greater than the third width of the width of the vehicle and the another vehicle, and wherein, in response to determining that the traffic participant is the pedestrian and the one or more processors execute instructions to: cause the vehicle to advance in the second direction at the second acceleration degree after notifying the traffic participants, and in response to determining that the traffic participant is the two-wheel vehicle and the one or more processors execute instructions to: cause the vehicle to advance in the second direction at the third acceleration degree that is lower than the second acceleration degree after notifying the traffic participants, the one or more processors execute instructions to: cause the vehicle to advance in the second direction at the second acceleration degree after notifying the traffic participants and cause the vehicle to advance in the second direction at the third acceleration degree that is lower than the second acceleration degree after notifying the traffic participants based on the vehicle being present on the road that has the first width in which vehicles cannot pass each other, in response to determining that the vehicle advancing in the first direction and the another vehicle advancing in the second direction face each other, the road has the retreat area for the vehicle or the another vehicle to retreat, the retreat area being disposed in the widthwise direction from the road, and the second width including the first width and the width of the retreat area being greater than the third width of the width of the vehicle and the another vehicle.

* * * * *